United States Patent
Wells et al.

(10) Patent No.: US 8,253,792 B2
(45) Date of Patent: Aug. 28, 2012

(54) VISION SYSTEM FOR MONITORING HUMANS IN DYNAMIC ENVIRONMENTS

(75) Inventors: James W. Wells, Rochester Hills, MI (US); Roland J. Menassa, Macomb, MI (US); Charles W. Wampler, II, Birmingham, MI (US); Swarup Medasani, Thousand Oaks, CA (US); Yuri Owechko, Newbury Park, CA (US); Kyungnam Kim, Newbury Park, CA (US); Yang Chen, Westlake Village, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 439 days.

(21) Appl. No.: 12/549,425

(22) Filed: Aug. 28, 2009

(65) Prior Publication Data
US 2011/0050878 A1   Mar. 3, 2011

(51) Int. Cl.
*H04N 9/47* (2006.01)
(52) U.S. Cl. .......... 348/86; 348/152; 348/345; 382/115; 382/181
(58) Field of Classification Search .............. 348/86, 348/152, 345; 382/115, 181
See application file for complete search history.

(56) References Cited

U.S. PATENT DOCUMENTS

| 5,323,470 | A | 6/1994 | Atsushi et al. | |
| 6,445,810 | B2* | 9/2002 | Darrell et al. | 382/115 |
| 2002/0061134 | A1* | 5/2002 | Cofer et al. | 382/181 |
| 2002/0186299 | A1* | 12/2002 | Cofer | 348/152 |
| 2005/0207618 | A1 | 9/2005 | Wohler et al. | |

FOREIGN PATENT DOCUMENTS
WO   WO2008061607 A1   5/2008
* cited by examiner

*Primary Examiner* — Yves Dalencourt
(74) *Attorney, Agent, or Firm* — MacMillan, Sobanski & Todd, LLC

(57) ABSTRACT

A safety monitoring system for a workspace area. The workspace area related to a region having automated moveable equipment. A plurality of vision-based imaging devices capturing time-synchronized image data of the workspace area. Each vision-based imaging device repeatedly capturing a time synchronized image of the workspace area from a respective viewpoint that is substantially different from the other respective vision-based imaging devices. A visual processing unit for analyzing the time-synchronized image data. The visual processing unit processes the captured image data for identifying a human from a non-human object within the workspace area. The visual processing unit further determining potential interactions between a human and the automated moveable equipment. The visual processing unit further generating control signals for enabling dynamic reconfiguration of the automated moveable equipment based on the potential interactions between the human and the automated moveable equipment in the workspace area.

37 Claims, 6 Drawing Sheets

VISION SYSTEM FOR MONITORING HUMANS IN DYNAMIC ENVIRONMENTS

BACKGROUND OF INVENTION

An embodiment relates generally to vision monitoring systems for tracking humans.

Manufacturing and assembly operations employ the use of safety devices to prevent harm to an operator working in the vicinity of the equipment. A plurality of sensors and other devices are disposed throughout a manufacturing or assembly process for sensing the operator's proximity to the equipment. In response to the operator being within a predetermined distance from the equipment, the equipment is shut down or prevented from executing a task due to the operator being within a caution zone of the equipment. The caution zone is a predefined area or region in which safety concerns are taken into consideration based on proximity of the operator to the equipment where a potential injury to an operator could occur.

The following are examples of safety devices used to detect the operator proximity to the equipment. Floor mats are utilized to sense whether a respective operator is standing on or off the floor mat. The floor mat is positioned at a predetermined distance from the equipment such that if the operator is standing on the floor mat, then the operator is considered being at an acceptable distance from the equipment for the assembly or manufacturing operations to continue. Another safety sensing device includes a light curtain sensor. The light curtain consists of an emitter array provided for emitting a signal and a receiver array for receiving the emitted signal. If an object is detected between the pair of sensors, then the equipment is immediately stopped and will not proceed with a next operation due to the sensors indicating that the operator is in too close of a proximity to the automated moveable equipment.

Other safety systems are known to utilize a vision-based sensing system. Vision-based sensing systems utilize a camera viewing a predefined area that surrounds the equipment. If the operator enters the predefined area, then intrusion is detected and the machine shuts down. However, shutting down the equipment is costly as it disrupts the flow and output of the assembly/manufacturing process. Typically, once the assembly/manufacturing process is interrupted, the machinery and controls must be reset to restart the process. Moreover, current safety systems such as current vision-based systems only sense the presence of an object entering the caution zone area and do not distinguish between a human and a non-human object. Therefore, these systems enforce exclusion zones where any object, including non-human objects, that are moving within the designated area are subject to stopping assembly/manufacturing process. As a result, the use of these conventional systems in a process setting that significantly mixes people and automation without hard guarding would result in excessive false alarms and nuisance trips that are costly in terms of productivity, time, and money.

SUMMARY OF INVENTION

An advantage of an embodiment of the invention provides for cognitive monitoring of humans in a manufacturing and assembly environment for enhancing the safety of workers and production efficiency. The system uses an automated visual supervision of human-to-machine interaction that does not depend on physical fences and guarding devices. The system enables a natural and intuitive interaction around moving equipment without the use of personal protective equipment. The effective monitoring of people and automation equipment improves factory processes by enabling virtual reconfigurable three dimensional fences around the automated equipment that can trigger warnings, slow down, speed up or shutdown the automated equipment dependent upon a predicted path of travel within the monitored area. This "virtual guarding" capability can reduce manufacturing process configuration/conversion times and reduce the amount of unused space around the automated equipment. While not explicitly described in detail, this capability is just as useful in non-manufacturing sectors where people and other types of systems interact where automated supervision of the interaction is desired. Some examples would be human interaction with transportation systems and amusement ride loading, interaction with automated material handling systems and enforcement of the flow and location of people for retail, tours, restricted access or for security reasons.

An embodiment contemplates a safety monitoring system for a workspace area or a number of enjoined areas using a number of interconnected monitoring systems that work as a single whole or in cooperation with each other. The workspace area associated with a region having automated moveable equipment. A plurality of vision-based imaging devices capturing time-synchronized image data of the workspace area. It is envisioned that the vision based sensor may be visible light, infrared light, multi lens array, stereo pair, infrared time of flight scanner/imager or structured light enabled 2D or 3D imaging. Each vision-based imaging device repeatedly captures a time synchronized image of the workspace area from a respective viewpoint that is substantially different from the other respective vision-based imaging devices. A visual processing unit for analyzing the time-synchronized image data generated by the plurality of vision-based imaging devices. The visual processing unit processes the captured image data for identifying a human from a non-human object within the workspace area. The visual processing unit further determining potential interactions between a human and the automated moveable equipment. The visual processing unit further generating control signals for enabling dynamic reconfiguration of the automated moveable equipment based on the potential interactions between the human and the automated moveable equipment in the workspace area. The visual processing unit further checking the integrity of the system for component failures and conditions that would prevent the system from operating properly and fulfilling its intended purpose. This "dynamic integrity monitoring" would detect these degraded or failure conditions and trigger a mode where the system can fail to a safe mode where system integrity can then be restored and the process interaction can return to normal without any unintended consequences besides the downtime needed to effect repairs. An operating area or work cell that is enabled with fiducial targets that can be used for geometric calibration and integrity. Some of these fiducial elements could be active such as a flashing IR beacon in the field of view of a sensor(s) that could verify the time bases updates of the image information and conditions where the image data is "frozen" or not updating.

An embodiment contemplates a method for identifying a potential interaction between a human and automated moveable equipment in a workspace area. Time synchronized images from a plurality of vision-based imaging devices in the workspace area. Each vision-based imaging device capturing respective time synchronized images from a respective viewpoint that is substantially different from the other respective vision-based imaging devices. Moveable objects are identified in the captured data of each respective viewpoint. Moveable object data is filtered for distinguishing humans from non-human objects. The human in each viewpoint of the captured data is collectively identified. The human in the workspace area is localized based on collective identification of the human using detection information from multiple views. A potential interaction with the automated moveable equipment is determined. A warning is provided in response to the potential interaction between the automated moveable equipment and the localized human(s) within the workspace area.

A variation of the safety monitoring capability of this system is monitoring restricted areas that may have significant and possibly hazardous automated or other equipment activity that only requires periodic service or access. This system would monitor the integrity of access controls to such areas and trigger alerts due to unauthorized access. Since service or routine maintenance in this area may be needed on off shifts or other downtime, the system would monitor authorized access and operations of a person (or persons) and would trigger alerts locally and with a remote monitoring station if activity unexpectedly stops due to accident or medical emergency. This capability could improve productivity for these types of tasks where the system could be considered part of a "buddy system" for the purposes of personal safety.

This system also has the capability to be applied in applications where the activities of people in an area are tracked and the motion and activity is logged. This is useful in the automated time and motion study of activities that can be used to monitor performance and provide date for use in improving work cell activity efficiency and productivity. This capability can also enable activity monitoring within a prescribed sequence where deviations in the sequence can be identified, logged and alerts can be generated for the detection of human task errors. This "error proofing" capability can be utilized to prevent task errors from propagating to downstream operations and causing quality and productivity problems due to mistakes in sequence or proper material selection for the prescribed task.

DETAILED DESCRIPTION

Figure 1:
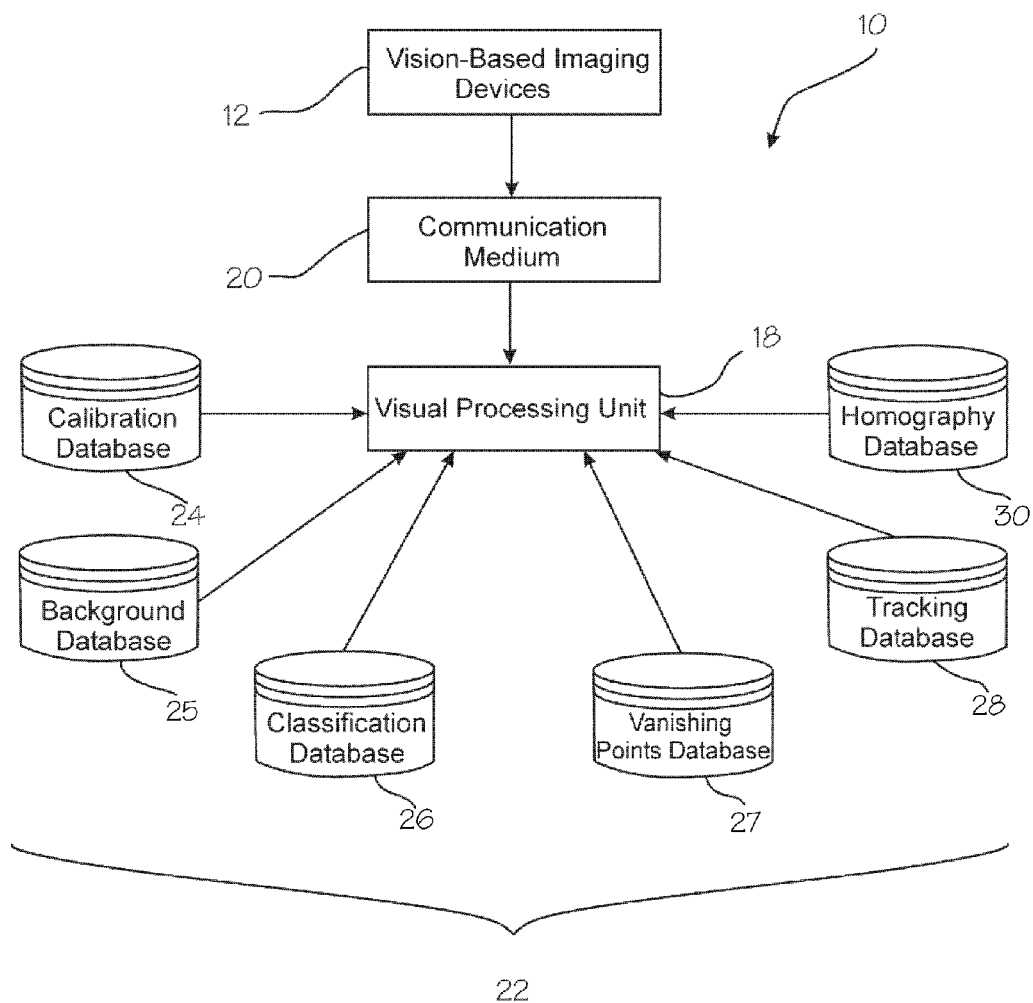
FIG. 1 is a block diagram of a safety monitoring system.
Figure 2:
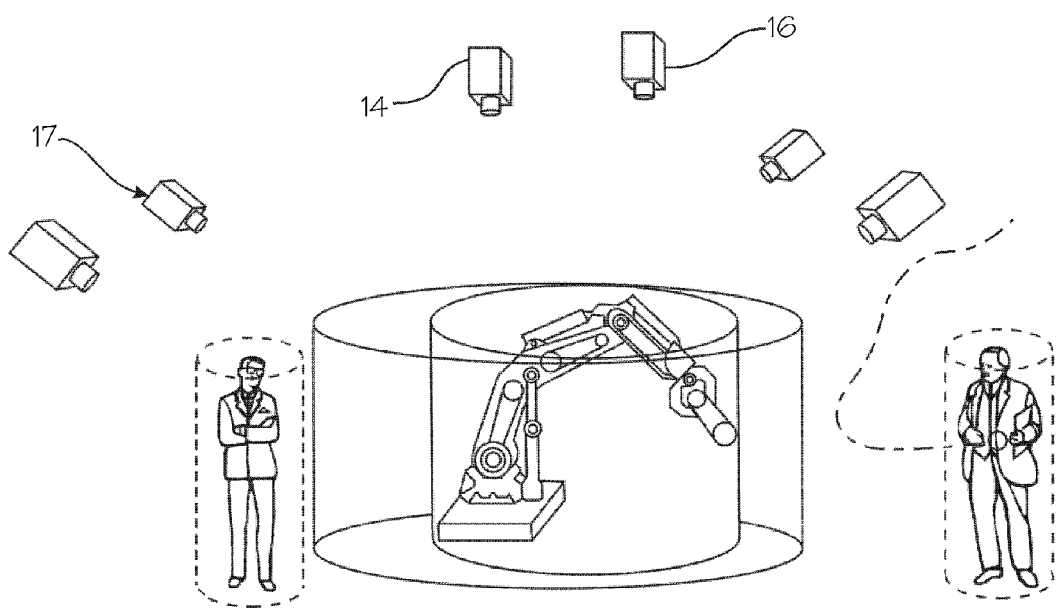
FIG. 2 is a graphic illustration of the imaging devices positioned in a workspace area.

There is shown in FIG. 1, generally at 10, a block diagram of a safety monitoring system for monitoring a workspace area of an assembly, manufacturing, or like process. The safety monitoring system 10 includes a plurality of vision-based imaging devices 12 for capturing visual images of a designated workspace area. The plurality of vision-based imaging devices 12, as illustrated in FIG. 2, is positioned at various locations and elevations surrounding the automated moveable equipment. Preferably, wide-angle lenses or similar wide field of view devices are used to visually cover more workspace area. Each of the vision-based imaging devices are substantially offset from one another for capturing an image of the workspace area from a respective viewpoint that is substantially different from the other respective imaging devices. This allows various streaming video images to be captured from different viewpoints about the workspace area for distinguishing a person from the surrounding equipment. Due to visual obstructions (i.e., occlusions) with objects and equipment in the workspace area, the multiple viewpoints increase the likelihood of capturing the person in one or more images when occlusions within the workspace area are present.

As shown in FIG. 2, a first vision-based imaging device 14 and a second vision-based imaging device 16 are substantially spaced from one another at overhead positions such that each captures a high angle view. The imaging devices 14 and 16 provide high-angle canonical views or reference views. Preferably, the imaging devices 14 and 16 provide for stereo-based three-dimensional scene analysis and tracking. Additional imaging devices may be positioned overhead and spaced from the first and second vision-based imaging device 14 and 16 for obtaining additional overhead views.

Various other vision-based imaging devices 17 are positioned to the sides or virtual corners of the monitored workspace area for capturing mid-angle views and/or low angle views. It should be understood that more or less imaging devices as that shown in FIG. 2 may be used since the number of vision-based imaging devices is reconfigurable as the system can work with any number of imaging devices; however, it is pointed out that as the number of redundant imaging devices increases, the level of integrity and redundant reliability increases. Each of the vision-based imaging devices 12 are spaced from one another for capturing an image from a viewpoint that is substantially different from one another for producing three dimensional tracking of one or more persons in the workspace area. The various views captured by the plurality of vision-based imaging devices 12 collectively provide alternative views of the workspace area that enable safety monitoring system 10 to identify each person in the workspace area. These various viewpoints provide the opportunity of tracking each person throughout the workspace area in three dimensional space and enhance the localization and tracking of each person as they move through the workspace area for detecting potential unwanted interactions between each respective person and the moving automated equipment in the workspace area.

Referring again to FIG. 1, the images captured by the plurality of vision-based imaging devices 12 are transferred to a processing unit 18 via a communication medium 20. The communication medium can be a communication bus, Ethernet, or other communication link (including wireless).

The processing unit 18 is preferably a host computer implemented with commodity components (not unlike a personal computer) or similar device appropriately packaged for its operating environment. The processing unit 18 may further include an image acquisition system (possibly comprised of a frame grabber and/or network image acquisition software) that is used to capture image streams for processing and recording image streams as time synchronized data. Multiple processing units can be interconnected on a data network using a protocol that ensures message integrity such as Ethernet-Safe. Data indicating the status of adjoining space supervised by other processing units can be exchanged in a reliable way including alerts, signals, and tracking status data transfers for people, objects moving from area to area or zones that span multiple systems. The processing unit 18 utilizes a primary processing routine and a plurality of sub-processing routines (i.e., one sub-processing routine for each vision-based imaging device). Each respective sub-processing routine is dedicated to a respective imaging device for processing the images captured by the respective imaging device. The primary processing routine performs multi-view integration to perform real-time monitoring of the workspace area based on the cumulative captured images as processed by each sub-processing routine.

In FIG. 1, a detection of a worker in the workspace area is facilitated by the sub-processing routines using a plurality of databases 22 that collectively detect and identify humans in the presence of other moveable equipment in the workspace area. The plurality of databases store data which is used to detect objects, identifies a person from the detected objects, and tracks an identified person in the workspace area. The various databases include, but are not limited to, a calibration database 24, a background database 25, a classification database 26, a vanishing point database 27, a tracking database 28, and a homography database 30. Data contained in the databases are used by the sub-processing routines to detect, identify, and track humans in the workspace area.

The calibration database 24 provides camera calibration parameters (intrinsic and extrinsic) based on patterns for undistorting distorted objects.

The background database 25 stores the background models for different views and the background models are used to the separate an image into its constituent background and foreground regions.

The classification database 26 contains a cascade of classifiers and related parameters for automatically classifying humans and non-humans.

The vanishing point database 27 contains the vanishing point information for each of the camera views and is used to do the vanishing point correction so that humans appear upright in the corrected imagery.

The tracking database 28 maintains tracks for each of the humans being monitored, new tracks are added to the database when new humans enter the scene and deleted when they leave the scene. The tracking database also has information on the appearance model for each human so that existing tracks can easily be associated with tracks at a different time step.

The homography database 30 contains the homography transformation parameters across the different views and the canonical view. Appropriate data from the database(s) can be transferred to a system supervising an adjoining area as a person travels into that area such that the seamless transition of tracking the person from area to area across multiple systems is enabled.

Figure 3:
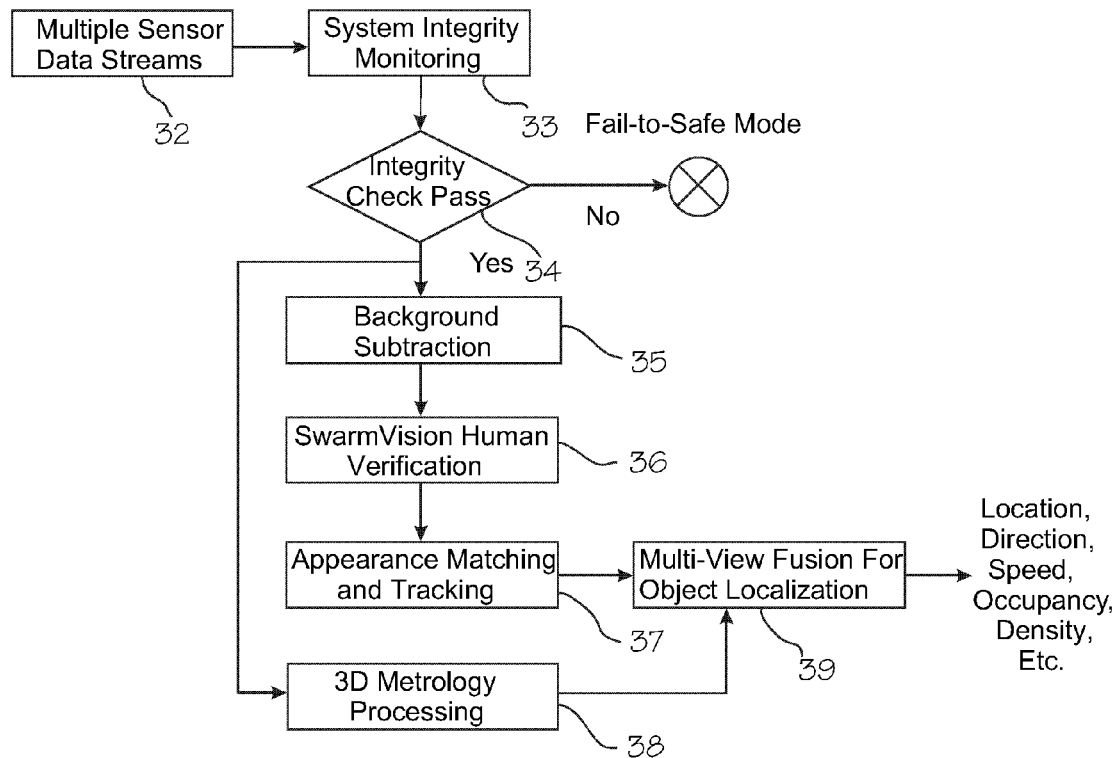
FIG. 3 illustrates a block diagram of a high level flow diagram of the monitoring process.

FIG. 3 illustrates a block diagram of a high level overview of the factory monitoring process flow including dynamic system integrity monitoring.

Figure 10:
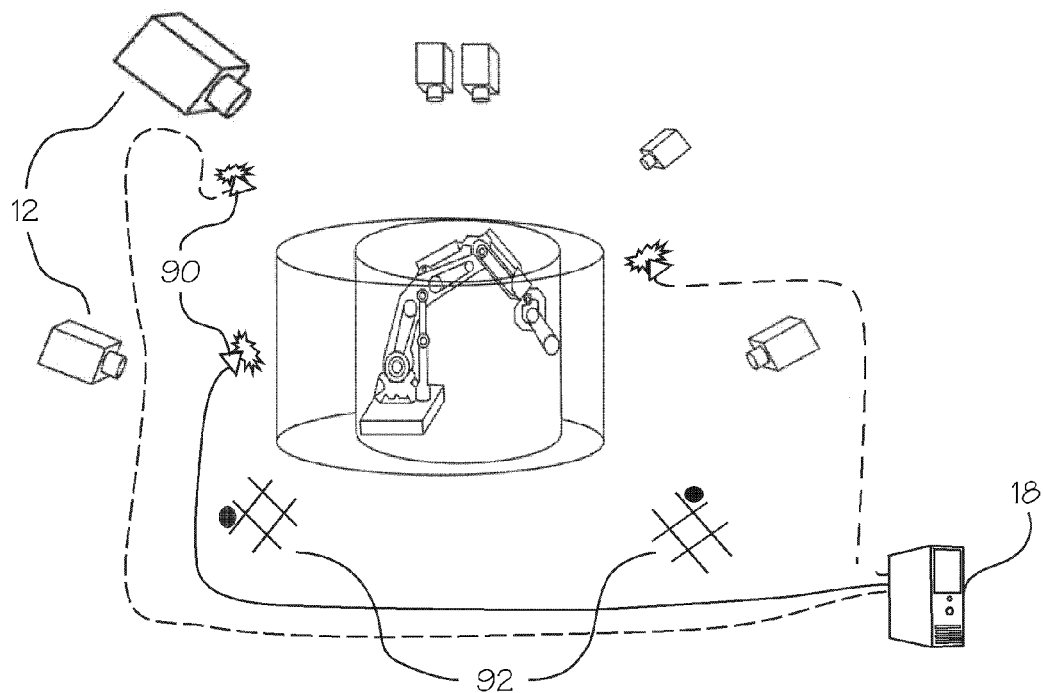
FIG. 10 illustrates the safety monitoring system utilizing IR beacons/fiduciary marks.

In block 32, data streams are collected from the vision-based imaging devices that capture the time synchronized image data. In block 33, system integrity monitoring is executed. The visual processing unit checks the integrity of the system for component failures and conditions that would prevent the monitoring system from operating properly and fulfilling its intended purpose. This "dynamic integrity monitoring" would detect these degraded or failure conditions and trigger a mode where the system can fail to a safe mode where system integrity can then be restored and the process interaction can return to normal without any unintended consequences besides the downtime needed to effect repairs. FIG. 10 illustrates an operating area or work cell that is enabled with fiducial targets that can be used for geometric calibration and integrity. Some of these fiducial elements could be active such as a flashing IR beacon in the field of view of a sensor(s) that could verify the time bases updates of the image information and conditions where the image data is "frozen" or not updating.

Figure 4:
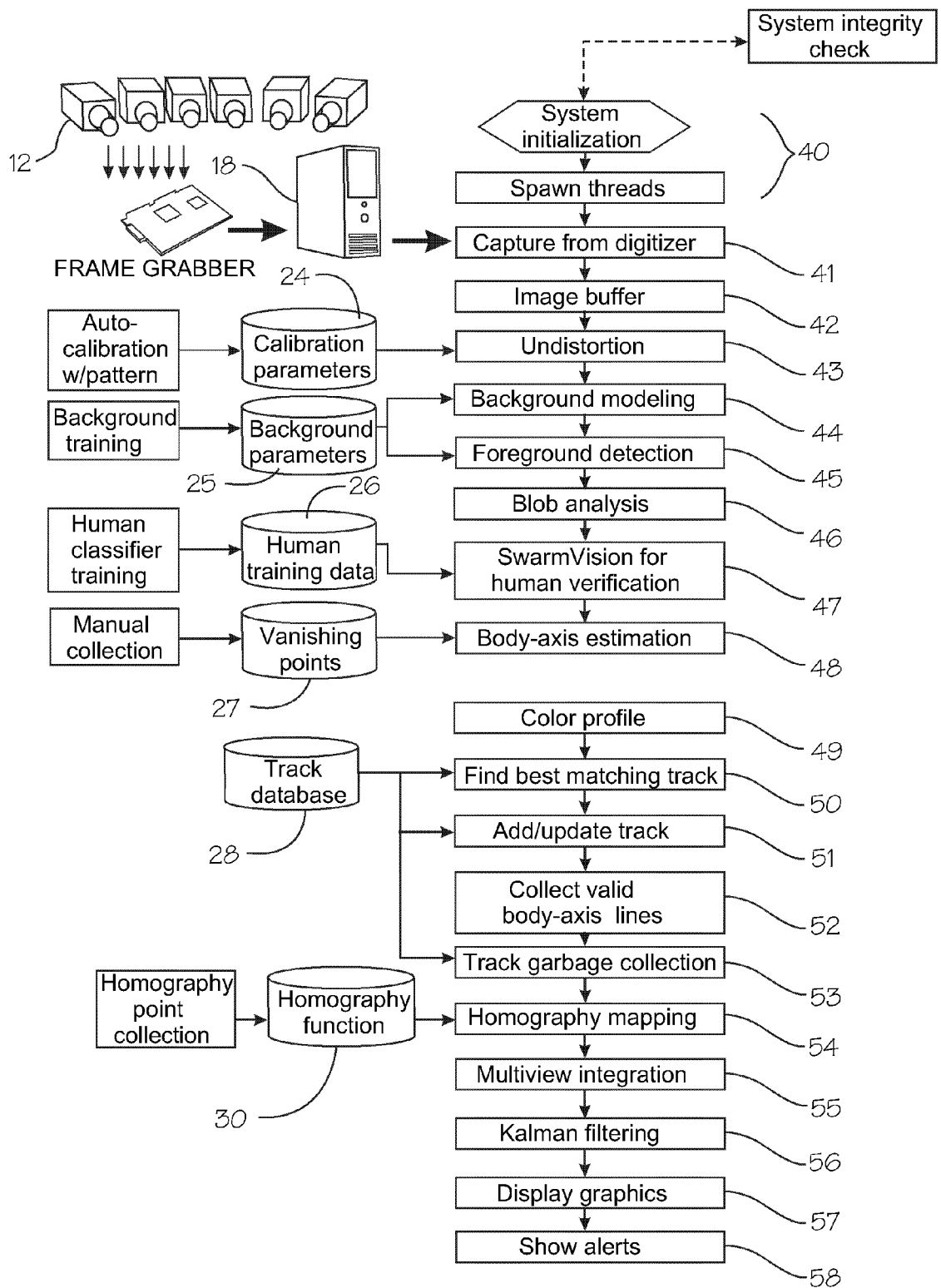
FIG. 4 illustrates a process flow diagram for the safety monitoring.

In block 34 of FIG. 4, if the visual processing unit determines integrity issues, then the system enters fail-to-safe mode where alerts are actuated and the system is shut down. If the visual processing unit determines that no integrity issues are present then blocks 35-39 are initiated sequentially. The background subtraction is performed in block 35 and the resulting images are the foreground regions.

In block 36, SwarmVision human verification is performed for detecting humans from the captured images.

In block 37, appearance matching and tracking is executed as describe earlier which identifies a person from the detected objects using its various databases, and tracks an identified person in the workspace area.

In block 38, three dimensional processing is applied to the captured data to obtain 3D range information for the objects in the workspace area. The 3D range information allows us to create 3D occupancy grids and voxelizations that reduce false alarms and allows us to track objects in 3D.

Figure 8:
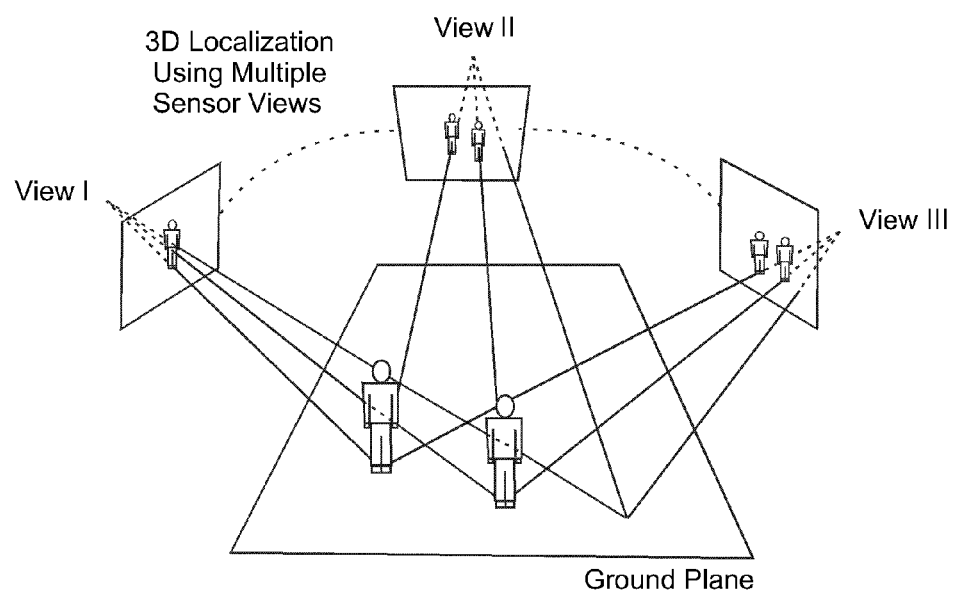
FIG. 8 is a schematic illustration of three dimensional localization using multiple sensor views.

In block 39, the matched tracks are provided to multi-view fusion and object localization module. In addition, three dimensional processing from the vision-based imaging devices, as shown in FIG. 8, are provided to the multi-view fusion and object localization module for determining the location, direction, speed, occupancy, and density of each human within the workspace area. The identified humans are tracked for potential interaction with moveable equipment within the workspace area.

FIG. 4 illustrates a process flow diagram for detecting, identifying and tracking humans using the safety monitoring system. In block 40, the system is initialized by the primary processing routine for performing multi-view integration in the monitored workspace area. The primary processing routine initializes and starts the sub-processing routines. A respective sub-processing routine is provided for processing the data captured by a respective imaging device. Each of the sub-processing routines operates in parallel. The following processing blocks, as described herein, are synchronized by the primary processing routine to ensure that the captured images are time synchronized with one another. The primary processing routine waits for each of the sub-processing routines to complete processing of their respective captured data before performing the multi-view integration. The processing time for each respective sub-processing routine is preferably no more than 100-200 msec. Also performed at system initialization is a system integrity check (see also FIG. 3, block 33). If it is determined that the system integrity check is failed, then the system immediately enables an alert and enters a fail-to-safe mode where the system is shut down until corrective actions are performed.

Referring again to FIG. 4, in block 41, streaming image data is captured by each vision-based imaging device. The data captured by each imaging devices is in (or converted to) pixel form. In block 42, the captured image data is provided to an image buffer where the images await processing for detecting objects, and more specifically, humans in the workspace area amongst the moving automated equipment. Each captured image is time stamped so that each captured image is synchronized for processing concurrently.

In block 43, auto-calibration is applied to the captured images for undistorting objects within the captured image. The calibration database provides calibration parameters based on patterns for undistorting distorted objects. The image distortion caused by wide-angle lenses requires that the image be undistorted through the application of camera calibration. This is needed since any major distortion of the image makes the homography mapping function between the views of the image device and the appearance models inaccurate. Imaging calibration is a one-time process; however, recalibration is required when the imaging device setup is modified. Image calibration is also periodically checked by the dynamic integrity monitoring subsystem to detect conditions where the imaging device is somehow moved from its calibrated field of view.

In blocks 44 and 45, background modeling and foreground detection is initiated, respectively. Background training is used to differentiate background images from foreground images. The results are stored in a background database for use by each of the sub-processing routines for differentiating the background and foreground. All undistorted images are background-filtered to obtain foreground pixels within a digitized image. To distinguish the background in a captured image, background parameters should be trained using images of an empty workspace viewing area so that the background pixels can be readily distinguished when moving objects are present. The background data should be updated over time. When detecting and tracking a person in the captured image, the background pixels are filtered from the imaging data for detecting foreground pixels. The detected foreground pixels are converted to blobs through connected component analysis with noise filtering and blob size filtering.

In block 46, blob analysis is initiated. In a respective workspace area, not only can a moving person be detected, but other moving objects such as robot arms, carts, or boxes may be detected. Therefore, blob analysis involves detecting all the foreground pixels and determining which foreground images (e.g., blobs) are humans and which are non-human moving objects. A blob may be defined as a region of connected pixels (e.g., touching pixels). Blob analysis involves the identification and analysis of the respective region of pixels within the captured image. The image distinguishes pixels by a value. The pixels are then identified as either a foreground or a background. Pixels with non-zero value are considered foreground and pixels with zero value are considered background. Blob analysis typically considers various factors that may include, but is not limited to, the location of the blob, the area of the blob, the perimeter (e.g., edges) of the blob, the shape of the blob, the diameter, length, or width of the blob, and orientation. Techniques for image or data segmentation are not limited to 2D images but can also leverage the output data from other sensor types that provide IR images and/or 3D volumetric data.

Figure 5:
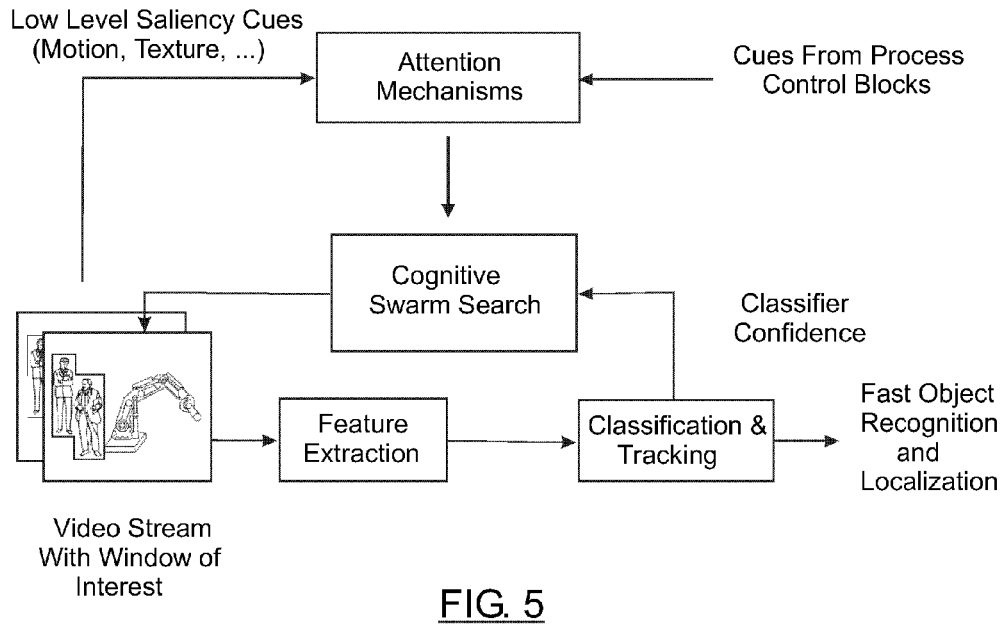
FIG. 5 illustrates a block diagram of a cognitive feedback loop for human identification.

In block 47, as part of the blob analysis, SwarmVision™ that is described in a co-pending application having a Ser. No. 10/918,336, filed on Aug. 14, 2004, which is incorporated by reference in its entirety, is used to filter out non-human blobs from the human blobs. Swarmvision™ developed at HRL Laboratories, Inc is a system for rapid detection of objects such as humans and vehicles from images and videos. It combines evolutionary search mechanisms for rapid search with robust classifier cascades for detecting the presence of an object at a given location. The SwarmVision™ system uses training data obtained from a human classification trainer and intelligent search algorithms based on cognitive swarms. FIG. 5 illustrates a block diagram of a cognitive feedback loop leveraging SwarmVision™ for integrating searching, recognition, and tracking of a human object. SwarmVision™ has the ability to classify and keep track of stationary and moving humans in the workspace area whether the background is stationary or moving.

Figure 6:
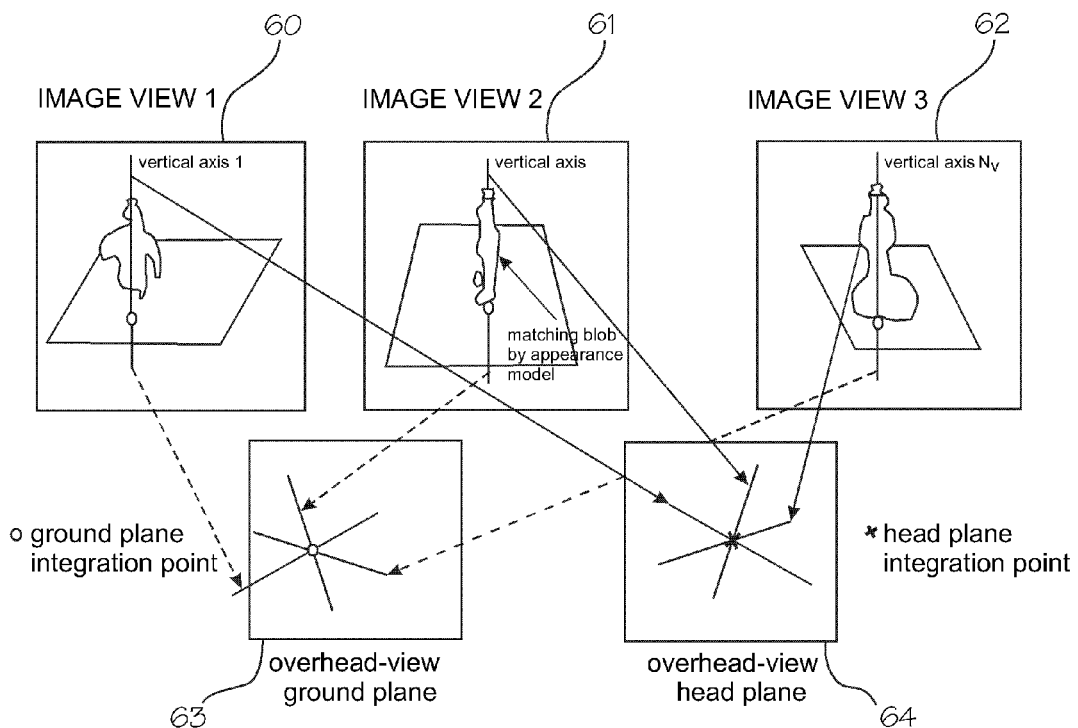
FIG. 6 is a schematic of homographic body-axes imaging.

Referring again to FIG. 4, body-axis estimation is executed in block 48 for each human blob identified by the SwarmVision™ filtering process. A principle body-axis line for each human blob is determined using vanishing points (obtained from the vanishing point database) in the image. That is, the body-axis line is defined by two points of interest. The first point is a centroid point of the identified human blob and the second point (i.e., vanishing point) is a respective point near a body bottom (i.e., not necessarily the blob bottom and possibly outside of the blob). The body-axis line is a virtual line connecting the centroid point to the vanishing point. A respective vertical body-axis line is determined for each respective human blob identified by the SwarmVision™ filtering process as is illustrated generally at 60, 61, and 62 of FIG. 6. A human detection score may be used to assist in a determination of the identification of a corresponding body-axis. The score provides a confidence level that a match to the human has been made and that the corresponding body-axis should be used. Each vertical body-axis line will be used via homography mapping to determine localization of the human and will be discussed in detail later.

Referring again to FIG. 4, color profiling is executed in block 49. A color appearance model is provided for matching the same person in each view. A color profile both fingerprints and maintains the identity of the respective person throughout each captured image.

In block 50, a "find best matching track" is determined. The system tries to find a best matching track for each detected blob by comparing the color model of every track to the respective blob. That is, the system attempts to associate tracks that exist in the database with tracks detected in the current image. An appearance model based on color profiles of the detected objects is used to associate the tracks so they can be propagated and adapted. The best matching tracks are the result of the association operation and tell us which of the tracks are new, which need to be deleted and which tracks are continuing. An appearance model uses the color profile for matching objects. The color profile is a vector of averaged color values of the body-axis line with the blob's bounding box. If a person does not match to any stored track in the tracking database or has not transferred in from an adjoining area a new track for the new person is initialized when detected. The new person is added to the track database for subsequent matching operations.

In block 51, an add/update track sub-processing routine is used when a best matching track is found. The blob's information is updated based on the best matching track.

In block 52, valid body-axis lines are collected for the multi-view integration. Also, in block 53 track "garbage collection" is executed so that old tracks can be automatically deleted from the database when they are no longer needed (e.g., when tracks transfer to adjoining systems or when the person simply exits the supervised area).

In blocks 54 and 55, homography mapping and multi-view integration routines are executed, respectively. Homography is a mathematical concept in geometry where an invertible transformation maps straight lines to straight lines. The respective body-axes lines are mapped so that each body-axis line has a point in common with one another. In homography mapping, vertical body-axis lines of each view intersect at a single point in the ground level when homographic mapping is performed illustrated, generally at 63, in FIG. 6.

The process works even when the ground point of the respective person from one of the viewpoints is occluded as even severely occluded blobs do not degrade the integration. Therefore, even though a person is occluded in one or more views, the body-axis line of other views mapped into the reference view provides high-confidence of the location of the person in the integrated view as localization of the person becomes more accurate through the multi-view integration. As a result, achieving accurate motion detection is not critical since principal-axes features are robust to noise. The principal-axis detection uses least median squares which allows the system to generate consistent labeled tracks. Alternatively, the homography mapping and integration can be performed using a head plane, as opposed to a ground plane, as illustrated generally by 64 in FIG. 6. Head plane integration is advantageously used as individuals have different heights, and as a result, the use of head planes of varying heights would be practically useful. Moreover, ground plane and head plane integration can both be cooperatively integrated with a plurality of planes added and used to refine the localization as needed including the chest, waist and knee planes that are utilized to further enhance localization accuracy. The homography information is refined in order to create the bounding envelope of the person being tracked. Depending on the resolution and configuration of the system, the person's individual extremities can be tracked and indicated in the bounding envelope. This capability is important if it is desired to generate a warning if someone reaches or steps into a zone where the presence of hands or feet are important to detect.

Referring again to FIG. 4, in block 56, each of the tracks is filtered using Kalman filtering. In the Kalman filtering, the state variables are the person's ground location and velocity. As a result, location, moving direction, and trajectory of each identified person is updated using the Kalman filtering. In block 57, the results are graphically displayed. This technique also attempts to "anticipate" the person's intention to continue to travel in a certain direction. This intention information can be used in other modules to calculate the closing rate of time and distance between the person and the detection zone (this is especially important in improving zone detection latency with dynamic detection zones that follow the movement of equipment, such as robots, conveyors, forklifts and other mobile equipment). This is also important information that can anticipate the person's movement into an adjoining monitored area where the person's data can be transferred and the receiving system can prepare attention mechanisms to quickly acquire tracking of the individual in the entered monitored area. System integrity is also checked since a person being tracked cannot "disappear" from the work cell. Tracks that have entered the work cell must be confirmed exiting the field of view or be successfully transferred to an adjoining system. Tracks that disappear, jump or otherwise fail to exhibit the dynamics associated with human motion and have not been reacquired by the local attention mechanisms must generate a fail to safe critical warning based on the latency that is determined by that person's last known position and the worst case time/distance potential for interaction with hazards. No critical warning is necessary and a tracking "dropout" is recorded if the individual can be acquired within the specified latency and the proper number of individuals continues to be tracked. Individuals that "pop up" in the work cell without being tracked into the work cell by a specified distance will also generate a critical warning, since this could be indicative of a system integrity fault or the individual is travelling or accelerating at a rate that is unsafe in the cell and outside of the capability for safe tracking resolution. Safety related information is displayed on a display device as persons walk through the pre-defined safe zones, warning zones, and critical zones of the workspace area. The warning zone and the critical zones (as well as any other zones desired to be configured in the system, including dynamic zones) are operating areas where alerts are provided, as initiated in block 58, when the person has entered the respective zone and is causing the equipment to slow, stop or otherwise avoid the person. The warning zone is an area where the person is first alerted to the fact that person has entered an area and is sufficiently close to the moveable equipment and could cause the equipment to stop. The critical zone is a location (e.g., envelope) which is designed within the warning zone. A more critical alert may be issued when the person is within the critical zone so that the person is aware of their location in critical zone or is requested to leave the critical zone. These alerts are provided to improve productivity of the process system by preventing nuisance equipment shutdowns caused by casual entry into the warning zones by persons who are unaware of their proximity. These alerts are also muted by the system during intervals of expected interaction such as routine loading or unloading parts from the process. It is also possible that a momentarily stationary person would be detected in the path of a dynamic zone that is moving in his direction.

Figure 7:
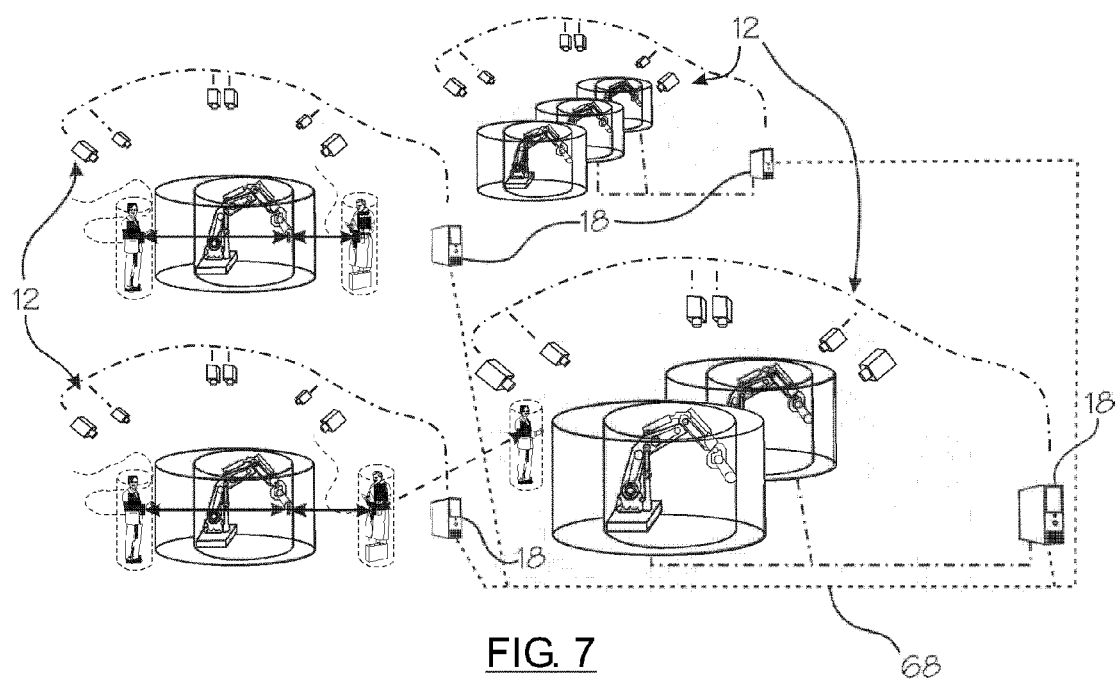
FIG. 7 is a graphic illustration of multiple workspace areas.

In addition to safety warnings provided to the person when in the respective zones, movement of the equipment may be modified (e.g., stopped, sped up, or slowed down) depending upon the predicted path of travel of the person (or possibly the dynamic zone) within the workspace area. That is, the movement of the automated equipment will operate under a set routine that has predefined movements at a predefined speed. By tracking and predicting the movements of the person within the workspace area, the movement of the automated equipment may be modified (i.e., slowed or sped up) to avoid any potential contact with the person within the workspace zone. This allows the equipment to maintain operation without having to shut the assembly/manufacturing process down. Current failsafe operations are governed by the results of a task based risk assessment and usually requires that factory automated equipment be completely stopped when a person is detected in a critical area. Startup procedures require an operator of the equipment to reset the controls to restart the assembly/manufacturing process. Such unexpected stoppage in the process usually results in downtime and loss of productivity. The safety monitoring system as described herein thoroughly detects and monitors a person within the workspace area from a plurality of different viewpoints such that the occlusion of a person in one or more of the viewpoints does not affect the tracking of the person. Moreover, the safety monitoring system can adjust and dynamically reconfigure the automated moveable factory equipment to avoid potential interactions with the person of within the workspace area without having to stop the automated equipment. This may include determining and traversing a new path of travel for the automated moveable equipment. The safety monitoring system can track multiple people within a workspace area, transfer tracking to other systems responsible for monitoring adjoining areas and various zones can be defined for multiple locations within the workspace area. FIG. 7 shows a graphic illustration of multiple workspace areas. The sensing devices 12 for a respective workspace area are coupled to a respective processing unit 18 dedicated to the respective workspace area. Each respective processing unit identifies and tracks the proximity of people transitioning within its respective workspace area and communicates to one another over a network safety related link 68 so that individuals can be tracked as they transition from one workspace area to another. As a result, multiple visual supervision systems can be linked for tracking individuals as they interact among the various workspace areas.

Figure 9:
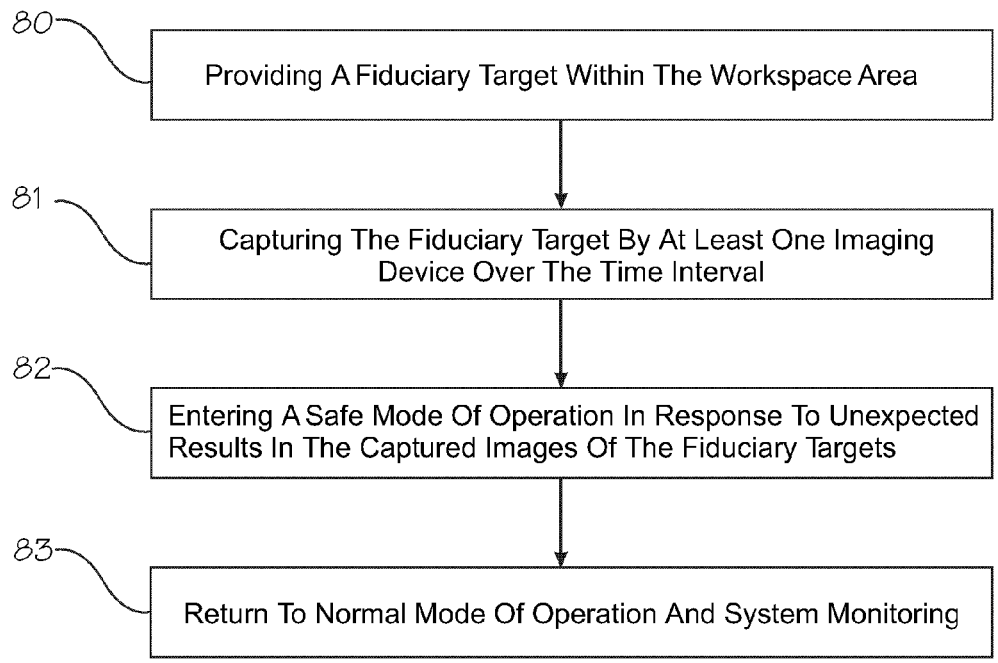
FIG. 9 is a flowchart of an exemplary method for dynamically monitoring the integrity of the vision-based monitoring system.

FIG. 9 is a flowchart of a method for dynamically monitoring the integrity of the vision based monitoring system. In step 80, at least one fiduciary target is provided in the workspace area. As described earlier, a fiduciary target may include, but is not limited to, a flashing infrared beacon (IR) which is used to detect changes in the image data over a respective time interval. A plurality of fiduciary targets may be used in the workspace area cooperatively to avoid any occlusions by either equipment or humans in the workspace area. The various vision-based imaging devices are time synchronized so that the captured image data may be cooperatively analyzed to avoid any false alerts caused by occlusions. Moreover, the fiduciary targets may be mounted at any respective location in the workspace to achieve the desired results of detecting changes in the image data.

In step 81, visual changes are detected in the captured image data using the fiduciary targets such as the detecting the flashes of the IR beacon over the respective time interval. The IR beacon may be flashed at a respective rate and the monitoring system may determine that the changes as detected in the images actually coincide with the expected rate of change that the IR beacon actually flashes.

In step 82, if no changes are detected in the fiduciary targets in the captured image data, then the automated equipment is modified to operate in a safe mode. However, unexpected changes may also result in modifying the equipment to work in the safe mode operation. For example, if a fiduciary target is a moving target that is tracked and disappears prior to detecting the fiduciary target exiting the workspace area from an expected exiting location, then the factory equipment may be modified to operate in the safe mode of operation. Another example of unexpected changes to a moving fiduciary target is when the fiduciary target appears at a first location and then re-appears at a second location that is disposed a predetermined distance from the first location within a predetermined time. The predetermine time being a period of time in which the fiduciary target would not be expected to arrive at the second location within that predetermined period of time.

In step 83, the equipment and monitoring system are reset to a normal mode of operation when the monitoring system is either fixed or it is affirmed that no errors are present in the current monitoring system.

FIG. 10 illustrates the safety monitoring system incorporating the IR beacons/fiduciary marks. At least one infrared (IR) beacon 90 is disposed in a viewing area of at least one imaging device 12. As stated earlier, the flashing IR beacon 90 is used to verify time updates of the image information to determine if the image data is not updating. The IR beacons 90 may be placed in an unutilized area of the field of view for uninterrupted viewing or may be placed in unobstructed areas in the workspace area and seen by multiple camera fields of view. In addition to the IR beacon 90, other fiduciary targets 92 may be used to detect lighting and resolution issues. Such fiduciary targets 92 provide information such that an object that is detected in the field may not be recognizable due to lighting or resolution issues. The shape of the object assists in determining whether the geometry associated with the object is inaccurate such that the monitoring system may require corrective calibration. It should also be understood that the fiduciary object as shown is only one example of a fiduciary target and that other shapes or objects may be used as fiduciary targets.

It should be understood that the use of the vision monitoring system in a factory environment as described herein is only one example of where the vision monitoring system can be utilized and that this vision monitoring system has the capability to be applied in any application outside of a factory environment where the activities of people in an area are tracked and the motion and activity is logged.

The vision monitoring system is useful in the automated time and motion study of activities that can be used to monitor performance and provide data for use in improving work cell activity efficiency and productivity. This capability can also enable activity monitoring within a prescribed sequence where deviations in the sequence can be identified, logged and alerts can be generated for the detection of human task errors. This "error proofing" capability can be utilized to prevent task errors from propagating to downstream operations and causing quality and productivity problems due to mistakes in sequence or proper material selection for the prescribed task.

It should also be understood that a variation of the safety monitoring capability of this system as described herein is monitoring restricted areas that may have significant and possibly hazardous automated or other equipment activity that only requires periodic service or access. This system would monitor the integrity of access controls to such areas and trigger alerts due to unauthorized access. Since service or routine maintenance in this area may be needed on off shifts or other downtime, the system would monitor authorized access and operations of a person (or persons) and would trigger alerts locally and with a remote monitoring station if activity unexpectedly stops due to accident or medical emergency. This capability could improve productivity for these types of tasks where the system could be considered part of a "buddy system" for the purposes of personal safety.

While certain embodiments of the present invention have been described in detail, those familiar with the art to which this invention relates will recognize various alternative designs and embodiments (including the ones mentioned in this document) for practicing the invention as defined by the following claims.

What is claimed is:

1. A safety monitoring system for a workspace area, the workspace area related to a region having automated moveable equipment, the system comprising:
 a plurality of vision-based imaging devices capturing time-synchronized image data of the workspace area, each vision-based imaging device repeatedly capturing respective time synchronized image data of the workspace area from a respective viewpoint that is different from the other respective vision-based imaging devices;
 a visual processing unit for analyzing the time-synchronized image data generated by the plurality of vision-based imaging devices;
 wherein the visual processing unit processes the captured time-synchronized image data for identifying a human from a non-human object within the workspace area by integrating one or more patterns in each of the time-synchronized image data, the visual processing unit further determining potential interactions between a human and the automated moveable equipment, the visual processing unit further generating control signals for enabling dynamic reconfiguration of the automated moveable equipment based on the potential interactions between the human and the automated moveable equipment in the workspace area, the dynamic reconfiguration including adjusting movements of the automated moveable equipment to avoid potential interactions between the human and the automated moveable equipment in the workspace area without stopping the automated equipment.

2. The safety system of claim 1 wherein the visual processing unit determines a predicted movement of the human in the workspace area, wherein the visual processing unit determines the potential interactions with the automated moveable equipment based on the predicted movements of the human in the workspace area, the visual processing unit further generating control signals for enabling dynamic reconfiguration of the automated moveable equipment based on the potential interactions between the predicted movements of the human and the automated moveable equipment in the workspace area.

3. The safety system of claim 1 wherein a preprogrammed movement of the automated moveable equipment is provided to the visual processing unit, and wherein the visual processing unit determines the potential interactions with the automated moveable equipment based on the predicted movements of the human in the workspace area and the preprogrammed movement of the automated moveable equipment, the visual processing unit further generating control signals for enabling dynamic reconfiguration of the automated moveable equipment based on the potential interactions between the predicted movements of the human and the preprogrammed movement of the automated moveable equipment in the workspace area.

4. The safety system of claim 1 further comprising a computer system for simultaneously capturing and formatting time-synchronized image streams in real-time from the plurality of vision-based imaging devices.

5. The safety system of claim 1 wherein the plurality of vision-based imaging devices includes at least two overhead cameras for providing high angle views of the workspace area.

6. The safety system of claim 5 wherein the plurality of vision-based imaging devices includes at least two vision-based imaging devices positioned to sides of the workspace area for capturing mid angle views.

7. The safety system of claim 6 wherein the plurality of vision-based imaging devices includes at least two vision-based imaging devices positioned at the sides of the workspace area for capturing low angle views.

8. The safety system of claim 1 further comprising a human classifier for identifying the presence of the human in workspace area in response to the image data captured by the plurality of vision-based imaging devices.

9. The safety system of claim 8 wherein the human classifier collectively identifies the human in each of the captured images, wherein the human classifier uses a multiple body-axes routine to identify a corresponding body axis, and wherein a human detection score is determined and used to integrate the corresponding body-axes.

10. The safety system of claim 1 further comprising a tracking database for providing a best matching track of the human within the workspace area, the tracking database containing a plurality of tracks of respective humans in the workspace, wherein one of the plurality of tracks may be selected from the tracking database that best identifies the human within the workspace area.

11. The safety system of claim 1 further comprising a filter for predicting movements of the human in the workspace.

12. The safety system of claim 1 further comprising an alert notification system for alerting the human in response to the visual processing unit determining that a potential interaction is likely to occur between the human and automated moveable equipment within the workspace area.

13. The safety system of claim 1 wherein the visual processing unit enables dynamic reconfiguration of virtual intrusion zones in relation to the automated moveable equipment in the workspace area based on the predicted movements of the human, the virtual intrusion zone being warning zones encapsulating the automated moveable equipment.

14. The system of claim 1 further comprising a second plurality of vision based imaging devices and a second visual processing unit for capturing and processing captured time-synchronous images data from a second workspace area, wherein data relating to humans are shared between the processing units for integrating a transition of a respective human between the first workspace area and the second workspace area.

15. The system of claim 1 further comprising a dynamic integrity monitoring subsystem that monitors integrity of the plurality of vision based imaging devices and visual processing unit for component failures, wherein the processing unit enables a safe mode of operation in response to detecting a component failure.

16. The system of claim 15 wherein the dynamic integrity monitoring system detects degradation conditions, wherein the processing unit enables the safe mode of operation in response to detecting the conditions.

17. A method for identifying a potential interaction between a human and automated moveable equipment in a workspace area, the system comprising:
    capturing time synchronized images from a plurality of vision-based imaging devices in the workspace area, each vision-based imaging device capturing respective time synchronized images from a respective viewpoint that is different from the other respective vision-based imaging devices;
    identifying moveable objects in the captured time synchronized images of each respective viewpoint;
    filtering moveable object data for distinguishing humans from non-human objects;
    collectively identifying the human in each viewpoint of the captured time synchronized images;
    localizing the human in the workspace area based on collective identification of the human;
    determining a potential interaction with the automated moveable equipment; and
    generating control signals for enabling dynamic reconfiguration of the automated moveable equipment based on the potential interactions between human and the automated moveable equipment in the workspace area.

18. The method of claim 17 further comprising the step of providing a warning in response to the potential interaction between the automated moveable equipment and the localized human within the workspace area.

19. The method of claim 17 further comprising the step of determining a predicted movement of the human in the workspace area, wherein the potential interactions between the human and the automated moveable equipment are further determined based on the predicted movements of the human in the workspace area, and wherein the control signals generated for enabling dynamic reconfiguration of the automated moveable equipment are further based on the potential interactions between the predicted movements of the human and the automated moveable equipment in the workspace area.

20. The method of claim 19 wherein the step of determining potential interactions between the human and the automated moveable equipment are further determined based on preprogrammed movements of the automated moveable equipment, and wherein the control signals generated for enabling dynamic reconfiguration of the automated moveable equipment are further based on the potential interactions between the predicted movements of the human and preprogrammed movements of automated moveable equipment in the workspace area.

21. The method of claim 19 wherein filtering is used to determine the next predicted movements of the human.

22. The method of claim 18 wherein enabling dynamic reconfiguration of the automated moveable equipment includes decreasing a speed of the automated moveable equipment to avoid the potential interaction between the human and the automated moveable equipment.

23. The method of claim 18 wherein enabling dynamic reconfiguration of the automated moveable equipment includes increasing a speed of the automated moveable equipment to avoid the potential interaction between the human and the automated moveable equipment.

24. The method of claim 18 wherein enabling dynamic reconfiguration of the automated moveable equipment includes dynamically determining and traversing a new path of travel for the automated movable equipment to avoid the potential interaction between the human and the automated moveable equipment.

25. The method of claim 18 wherein enabling dynamic reconfiguration of the automated moveable equipment includes stopping the automated moveable equipment to avoid the potential interaction between the human and the automated moveable equipment.

26. The method of claim 17 wherein the step of collectively identifying the human in each of the captured images includes color profiling.

27. The method of claim 17 wherein the step of collectively identifying the human in each of the captured images includes applying body-axis modeling.

28. The method of claim 17 wherein the step of localizing the human in the workspace area includes applying a multi-view integrated body-axes mapping.

29. The method of claim 17 wherein additional workspace areas are monitored by additional vision based capturing devices, wherein data relating to humans are shared between workspace areas for integrating a transition of a respective human from a first workspace area to an adjacent workspace area.

30. The method of claim 17 wherein a warning is actuated in response to a respective human disposed within the workspace area becoming undetected within the workspace area by the plurality of vision-based imaging devices prior to detecting the respective human exiting the workspace area.

31. The method of claim 17 wherein a warning is actuated in response to detecting a respective human within the workspace by the plurality of vision-based imaging devices prior to detecting the respective human entering the workspace area.

32. A method for dynamically monitoring an integrity of a vision based safety monitoring system of a workspace area for failures, the workspace area relating to a region having automated moveable equipment, the method comprising the steps of:
provinding a fiduciary target within the workspace area;
providing a plurality of vision-based imaging devices for capturing time-synchronized image data of the workspace area, the plurality of vision based imaging devices being disposed at various locations about the workspace area for capturing images of the fiduciary target;
capturing images of the fiduciary target by the plurality of vision-based imaging devices over a time interval, the captured images from the plurality of vision-based imaging devices are collectively time synchronized for preventing occlusion of the fiduciary target by at least one of the respective vision-based imaging devices;
determining whether visual changes in the fiduciary target in the captured image data have occurred;
modifying the automated equipment to operate in a safe mode in response to no visual changes detected in the captured image of the fiduciary targets over the time interval; and
otherwise maintaining the current operating conditions of the automated equipment.

33. The method of claim 32 wherein the step of determining visual changes in the fiduciary target includes determining whether the image data captured by at least one of the plurality of imaging devices changes over the predetermined period of time.

34. The method of claim 33 wherein the fiduciary target includes a flashing beacon, wherein determining visual changes in the fiduciary target includes determining whether flashes during an operation of the beacon are detected in the captured image data over the time interval.

35. The method of claim 34 wherein the flashing beacon is flashed at a respective rate, and wherein determining visual changes in the flashing beacon in the captured image data includes determining that the beacon is flashing at the respective rate from the capture image data.

36. The method of claim 32 further comprising the step of modifying the automated equipment to operate in a safe mode in response to the fiduciary target captured in the images within the workspace area becoming undetected within the workspace area prior to detecting the fiduciary target exiting the workspace area.

37. The method of claim 32 further comprising the step of modifying the automated equipment to operate in a safe mode in response to movement of the fiduciary target from a first location to a second location, wherein the second location is disposed a predetermined distance from the first location, wherein the fiduciary target appears at the second location within a predetermined time from being last detected at the first location.

* * * * *